United States Patent
Luo et al.

(10) Patent No.: US 11,906,723 B2
(45) Date of Patent: Feb. 20, 2024

(54) HIGH-THROUGHPUT OPTICAL SECTIONING THREE-DIMENSIONAL IMAGING SYSTEM

(71) Applicant: HUST-SUZHOU INSTITUTE FOR BRAINSMATICS, Suzhou Jiangsu (CN)

(72) Inventors: Qingming Luo, Suzhou Jiangsu (CN); Jing Yuan, Suzhou Jiangsu (CN); Qiuyuan Zhong, Suzhou Jiangsu (CN); Rui Jin, Suzhou Jiangsu (CN); Hui Gong, Suzhou Jiangsu (CN)

(73) Assignee: HUST-SUZHOU INSTITUTE FOR BRAINSMATICS, Jiangsu (CN)

( * ) Notice: Subject to any disclaimer, the term of this patent is extended or adjusted under 35 U.S.C. 154(b) by 407 days.

(21) Appl. No.: 17/302,330

(22) Filed: Apr. 30, 2021

(65) Prior Publication Data

US 2021/0333536 A1    Oct. 28, 2021

Related U.S. Application Data

(63) Continuation of application No. PCT/CN2019/098367, filed on Jul. 30, 2019.

(30) Foreign Application Priority Data

Nov. 1, 2018    (CN) .......................... 201811296073.4

(51) Int. Cl.
*G02B 21/36* (2006.01)
*H04N 13/156* (2018.01)
(Continued)

(52) U.S. Cl.
CPC ......... *G02B 21/367* (2013.01); *G02B 21/008* (2013.01); *G02B 21/0032* (2013.01);
(Continued)

(58) Field of Classification Search
CPC ....... G02C 7/00; G02C 2202/10; G06F 1/163; H04N 13/239; H04N 13/344;
(Continued)

(56) References Cited

U.S. PATENT DOCUMENTS

2004/0026630 A1 * 2/2004 Mohun .............. G01N 21/6486
422/82.08
2006/0275847 A1    12/2006 Goodyer et al.
(Continued)

FOREIGN PATENT DOCUMENTS

CN    101661159    3/2010
CN    102928970    2/2013
(Continued)

OTHER PUBLICATIONS

Extended European Search Report from related Appln. No. 19878242.7, dated Nov. 25, 2021.
(Continued)

*Primary Examiner* — Fernando Alcon
(74) *Attorney, Agent, or Firm* — Grossman, Tucker Perreault & Pfleger, PLLC (57) ABSTRACT

A high-throughput optical sectioning three-dimensional imaging system which includes: a light beam modulation module configured to modulate a light beam into a modulated light beam capable of being focused on a focal plane of an objective lens and being defocused on a defocusing plane of the objective lens; an imaging module configured to employ a camera to image, in different rows of pixels, a sample under illumination of the modulated light beam; a cutting module configured to cut off an imaged surface layer of the sample; a demodulation module configured to demodulate a sample image of one sample strip of one surface layer into an optical sectioning image, and reconstruct the optical sectioning image of each sample strip of
(Continued)

each surface layer into a three-dimensional image. The present disclosure achieves imaging of a whole sample by dividing the sample into at least one surface layer, dividing the at least one surface layer into at least one sample strip, and imaging each sample strip. When a multi-layer imaging cannot be performed, the imaged part can be cut off by the cutting module to realize imaging of any layer of the sample, thereby improving the imaging speed and efficiency.

9 Claims, 6 Drawing Sheets (51) Int. Cl.
  *H04N 13/221* (2018.01)
  *G02B 21/00* (2006.01)
  *G02B 21/08* (2006.01)
  *G02B 27/09* (2006.01)

(52) U.S. Cl.
  CPC ....... *G02B 21/0036* (2013.01); *G02B 21/082* (2013.01); *G02B 27/0966* (2013.01); *H04N 13/156* (2018.05); *H04N 13/221* (2018.05)

(58) Field of Classification Search
  CPC ...... H04N 2213/008; G02B 2027/0134; G02B 2027/0138; G02B 2027/014; G02B 2027/0178; G02B 27/0172
  See application file for complete search history.

(56) References Cited

U.S. PATENT DOCUMENTS

| | | | | |
|---|---|---|---|---|
| 2008/0259445 A1* | 10/2008 | Kubo | ................ | G02B 21/0076 359/388 |
| 2010/0188496 A1* | 7/2010 | Xie | ................ | G01N 21/65 348/79 |
| 2012/0002030 A1* | 1/2012 | Kalkbrenner | ................ | G02B 21/16 359/385 |
| 2012/0127464 A1* | 5/2012 | Oigawa | ................ | H01S 3/083 372/18 |
| 2012/0140243 A1* | 6/2012 | Colonna de Lega | ................ | G01B 11/2518 356/609 |
| 2014/0340476 A1* | 11/2014 | Sun | ................ | G03H 1/0443 348/40 |
| 2017/0054963 A1* | 2/2017 | Kasazumi | ................ | H04N 13/302 |
| 2020/0184624 A1* | 6/2020 | Jang | ................ | H04N 23/10 |
| 2020/0242791 A1* | 7/2020 | Liu | ................ | A61B 1/00009 |
| 2022/0137388 A1* | 5/2022 | Anhut | ................ | G02B 26/10 348/43 |
| 2023/0045982 A1* | 2/2023 | Lapstun | ................ | G02B 27/0093 |

FOREIGN PATENT DOCUMENTS

| | | |
|---|---|---|
| CN | 103207449 | 7/2013 |
| CN | 104061879 | 9/2014 |
| JP | 7-120681 | 5/1995 |
| JP | 2004-515780 | 5/2004 |
| WO | 02/48692 | 6/2002 |
| WO | WO-2012029251 A1 * | 3/2012 ........... G02B 5/3058 |
| WO | 2018/094290 | 5/2018 |

OTHER PUBLICATIONS

Jiang et al., "A Platform for Efficient Identification of Molecular Phenotypes of Brain-Wide Neural Circuits", Scientific Reports, Retrieved from the Internet: https://www.nature.com/articles/s41598-017-14360-6, 2021, England, 12 pages.

Poher et al., "Improved Sectioning in a Slit Scanning Confocal Microscope", Optics Letters, Optical Society of America, vol. 33, No. 16, pp. 1813-1815, 2008.

International Search Report from corresponding PCT Appln. No. PCT/CN2019/098367, dated Oct. 24, 2019.

Office Action from related Japanese Appln. No. 2021-523977 dated Jun. 28, 2022. English translation attached.

Office Action from related Canadian Appln. No. 3,118,389, dated May 30, 2022.

Office Action from related Korean Appln. No. 10-2021-716637, dated Jun. 28, 2022. English translation attached.

* cited by examiner

HIGH-THROUGHPUT OPTICAL SECTIONING THREE-DIMENSIONAL IMAGING SYSTEM

CROSS-REFERENCE TO RELATED APPLICATIONS

The present application is a continuation of International Application No. PCT/CN2019/098367 filed on Jul. 30, 2019, which is based on and claims priority to Chinese Patent Application No. 201811296073.4 filed on Nov. 1, 2018, which is incorporated herein by reference in its entirety.

FIELD

The present disclosure relates to imaging technology, and more particularly, to a high-throughput optical sectioning three-dimensional imaging system.

BACKGROUND

In the technical field of optical imaging, an out-of-focus interference of a traditional wide-field microscope makes it impossible to obtain a sharp image of the focal plane. Generally, the background interference can be avoided by cutting a tissue into slices. Optical slicing can achieve an imaging effect similar to that of the tissue slicing by an optical imaging method, and can also be referred to as optical sectioning. Confocal microscopic imaging technology can block a defocusing background interference and only allow the passage of an effective signal of the focal surface by placing a pinhole in front of a detector, thereby achieving an optical sectioning effect. Multi-photon excitation microscopic imaging technology has enough energy to excite fluorescence signal only at a focal point of a sample by utilizing a nonlinear effect, thereby achieving an ideal optical sectioning effect. However, both of the two optical sectioning technologies adopt a point-by-point scanning imaging mode which has an obviously insufficient imaging throughput in comparison with the wide-field imaging mode.

Structured illumination microscopic imaging technology implements modulation of a focal plane signal by superimposing a high-frequency periodic pattern modulation on a wide-field illumination, and a defocusing signal is suppressed due to rapid attenuation of the high-frequency modulation, thereby achieving optical sectioning. In the implementation of this process, at least three original images with different modulation phases are required, and the focal plane signal is demodulated by using a structured illumination microscopic imaging reconstruction algorithm to obtain an optical sectioning image. Compared with the confocal and multi-photon excitation microscopic imaging technologies which also have an optical sectioning ability respectively, the structured illumination microscopic imaging has advantages of high imaging throughput due to the wide-field imaging manner. When a large-size sample needs to be imaged, the structured illumination microscopic imaging technology generally needs to use a mosaic stitching method to expand the imaging field. In this way, most of the time spent for imaging the large-size sample is used for movement of the sample between the mosaics, therefore the overall imaging speed is limited. In order to avoid an excessive mosaic stitching, Chinese patent application No. 201310131718. X discloses a structured light fast scan imaging method which uses line scanning and strip imaging to improve the imaging speed, and uses structured illumination to suppress the background interference, thereby realizing acquiring an optical sectioning image of a large-size sample quickly. However, this method also needs to scan back and forth the imaging area of the sample three times to obtain raw data required for reconstruction of a structured illumination microscopic optical sectioning image, and therefore sacrifices the imaging speed. In addition, this imaging method needs to use a light beam modulation device in a strip imaging system to achieve modulation of the illumination light field, thereby increasing the complexity of the system. Meanwhile, because it uses a conventional structured illumination microscopic imaging method, imaging quality is highly dependent on the contrast of the modulation pattern. Furthermore, the current imaging methods cannot perform three-dimensional imaging, and therefore it is necessary to develop a simple and efficient high-throughput optical sectioning three-dimensional imaging system.

SUMMARY

An object of the present disclosure is to overcome the above technical deficiencies, propose a high-throughput optical sectioning three-dimensional imaging system, and solve the technical problem of low speed of three-dimensional imaging in the prior art.

To achieve the above technical object, the technical solution of the present disclosure provides a high-throughput optical sectioning three-dimensional imaging system which includes:
  a light beam modulation module configured to modulate a light beam into a modulated light beam capable of being focused on a focal plane of an objective lens and being defocused on a defocusing plane of the objective lens, the modulated light beam having incompletely identical modulated intensities on the focal plane of the objective lens;
  an imaging module configured to image, in different rows of pixels, at least one sample strip of at least one surface layer of a sample under illumination of the modulated light beam;
  a cutting module configured to cut off an imaged surface layer of the sample;
  a demodulation module configured to demodulate a sample image of one sample strip of one surface layer into an optical sectioning image, and reconstruct the optical sectioning image of each sample strip of each surface layer into a three-dimensional image.

Compared with the prior art, the present disclosure achieves imaging of a whole sample by dividing the sample into at least one surface layer, dividing the at least one surface layer into at least one sample strip, and imaging each sample strip. When a multi-layer imaging cannot be performed, the imaged part can be cut off by the cutting module to realize imaging of any layer of the sample, thereby improving the imaging speed and efficiency.

DETAILED DESCRIPTION

In order to make objects, technical solutions, and advantages of the present disclosure more apparent, the present disclosure will be further described in detail below with reference to the accompanying drawings and embodiments. It should be appreciated that the specific embodiments described herein are merely intended to explain the present disclosure and are not intended to limit the present disclosure.

Figure 1:
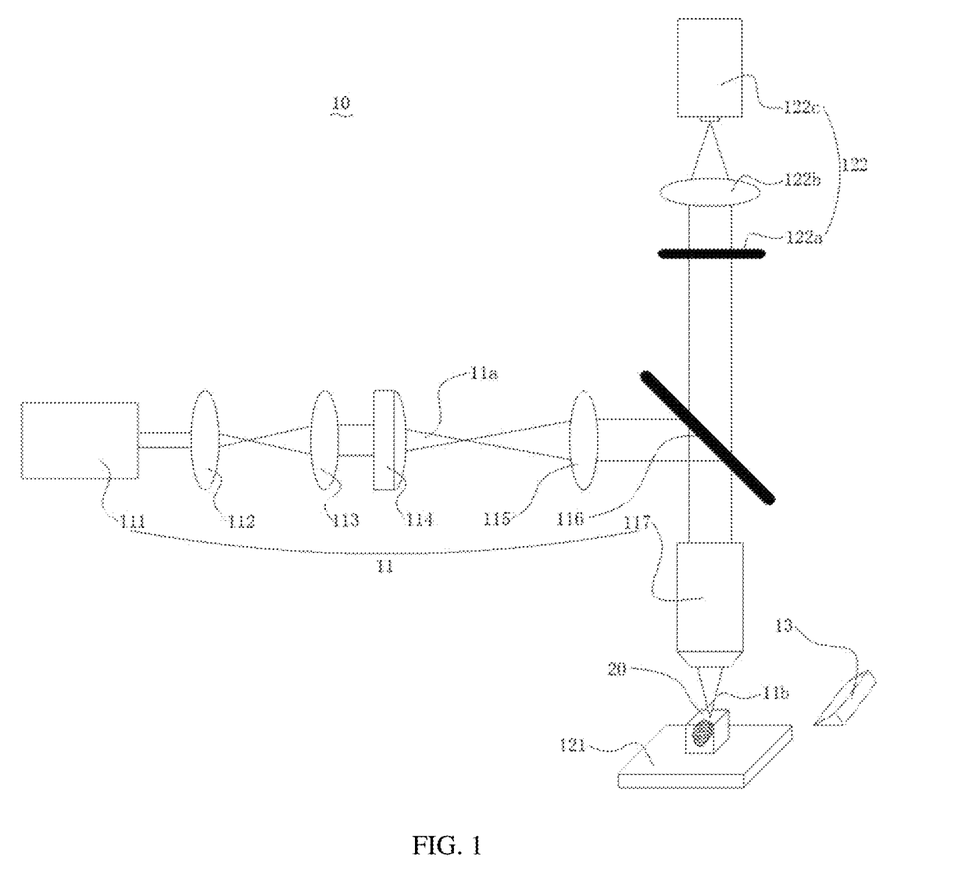
FIG. 1 is a schematic diagram showing an optical structure of a high-throughput optical sectioning three-dimensional imaging system of the present disclosure.
Figure 2:
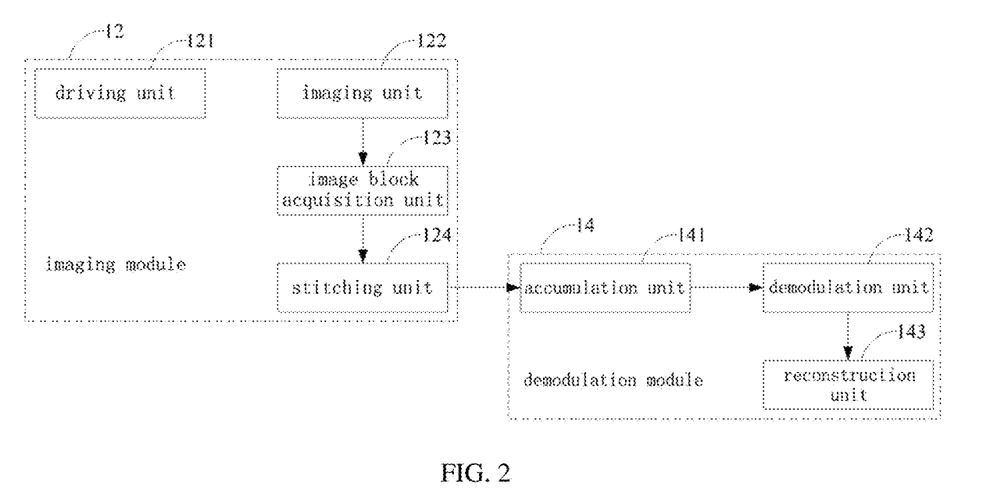
FIG. 2 is a block diagram showing a connection of a high-throughput optical sectioning three-dimensional imaging system of the present disclosure.
Figure 3:
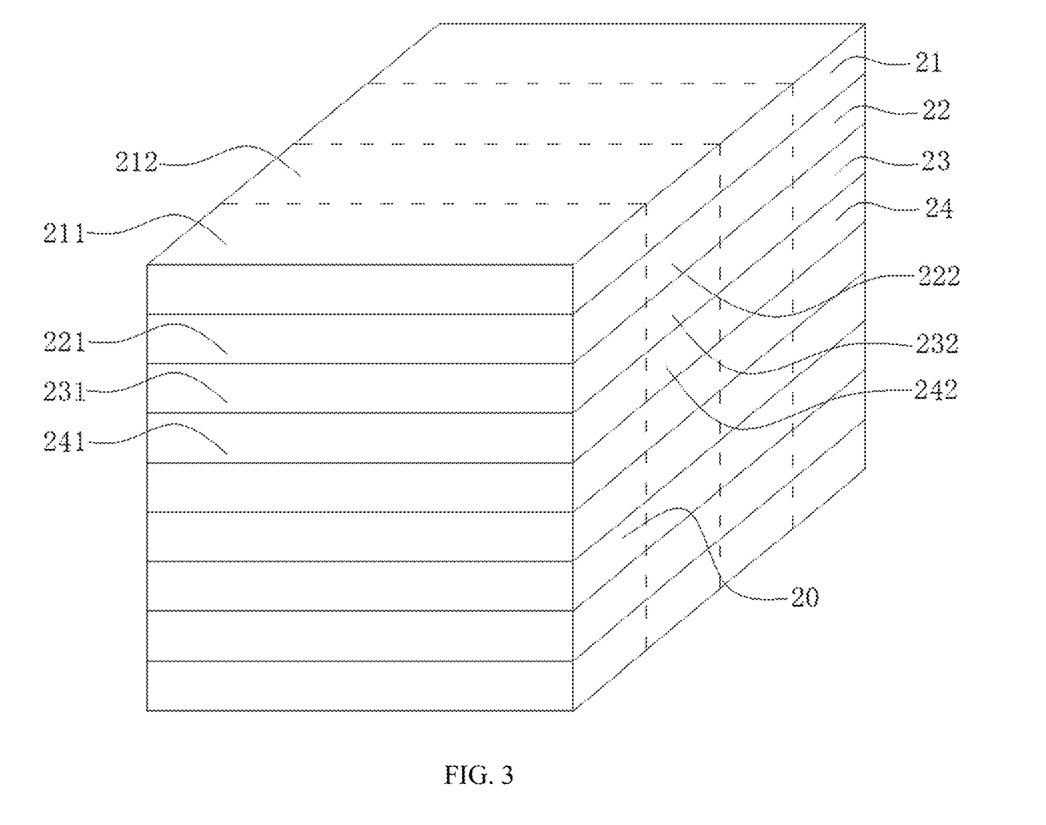
FIG. 3 is a schematic diagram showing sample imaging of the present disclosure.

As shown in FIGS. 1, 2 and 3, the present disclosure provides a high-throughput optical sectioning three-dimensional imaging system 10 including a light beam modulation module 11, an imaging module 12, a cutting module 13 and a demodulation module 14.

The light beam modulation module 11 is configured to modulate a light beam into a modulated light beam 11b capable of being focused on a focal plane of an objective lens 117 and capable of being defocused on a defocusing plane of the objective lens 117, and the modulated light beam 11b has incompletely identical modulated intensities on the focal plane of the objective lens 117. The light beam modulation module 11 includes a shaping optical path for shaping illumination light into a linear light beam 11a and a modulation optical path for modulating the linear light beam 11a into the modulated light beam 11b for linear light illumination.

The light beam modulation module 11 may be composed of a laser light source 111, a first lens 112, a second lens 113, a cylindrical lens 114, a third lens 115, a dichroic mirror 116 and an objective lens 117, which are sequentially arranged along the direction of the light. The laser light source 111, the first lens 112, the second lens 113 and the cylindrical lens 114 form the shaping optical path, and the third lens 115, the dichroic mirror 116 and the objective lens 117 form the modulation optical path. During the light shaping, the laser light source 111 emits illumination light which is sequentially processed by first lens 112 and the second lens 113 so as to be an expanded light beam. The expanded light beam is modulated by the cylindrical lens 114 to form the linear light beam 11a. The linear light beam 11a is a divergent light. Then, the linear light beam 11a is modulated by the third lens 115 to form the parallel light rays. Then, the dichroic mirror 116 modulates an incident direction of the line light beam 11a, and then the linear light beam 11a enters the objective lens 117 to form the modulated light beam 11b for linear light illumination which can be focused on the focal plane of the objective lens 117 and can diverge on the defocusing plane of the objective lens 117. In order to facilitate subsequent imaging, an optical axis of the modulated light beam 11b is perpendicular to an optical axis of the illumination light and an optical axis of the linear light beam 11a which has not been reflected, that is, the first lens 112, the second lens 113, the cylindrical lens 114 and the third lens 115 are arranged coaxially, and central axes of the first lens 112, the second lens 113, the cylindrical lens 114 and the third lens 115 are arranged perpendicular to a central axis of the objective lens 117. Furthermore, the angle between the dichroic mirror 116 and the optical axis of the modulated light beam 11b is 45 degrees, ensuring that the width of the linear light beam 11a after being reflected by the dichroic mirror 116 does not change.

In the present embodiment, the illumination light is firstly shaped into a linear light beam 11a, and then the linear light beam 11a is modulated into the modulated light beam 11b for linear illumination. In the present embodiment, a sample 20 is illuminated by the linear modulated light beam 11b that can be focused on the focal plane of the objective lens 117 and can diverge on the defocusing plane of the objective lens 117, which can facilitate exciting the sample 20 to emit fluorescence, thereby facilitating subsequent imaging.

Here, the above-mentioned modulated light beam 11b in the focal plane of the objective lens has been specifically subject to a waveform modulation with incompletely identical modulation intensities, for example, Gaussian modulation, sinusoidal modulation, or triangular modulation or the like with incompletely identical modulation intensities. Since the illumination light beam of the present embodiment adopts a Gaussian beam, the modulated beam 11b formed in the present embodiment is formed by the Gaussian modulation. This embodiment may also use other waveform modulations with incompletely identical modulation intensities as needed.

The imaging module 12 is configured to image, in different rows of pixels, at least one sample strip of at least one surface layer of the sample 20 under illumination of the modulated light beam 11b. The imaging module 12 includes a driving unit 121, an imaging unit 122, an image block acquisition unit 123 and a stitching unit 124. The driving unit 121 is configured to drive the light beam modulation module 11 and the sample 20 to move relative to each other in three directions perpendicular to one another. The imaging unit 122 is configured to perform continuous imaging along a lengthwise direction of the sample strip, and the lengthwise direction of the sample strip is the same as one of the directions along which the light beam modulation module 11 and the sample 20 move relative to each other.

In order to cooperate with the light beam modulation module 11, the driving unit 121 in this embodiment may adopt a three-dimensional motorized translation stage. The sample 20 may be placed on the three-dimensional motorized translation stage. The three-dimensional motorized translation stage can drive the sample 20 to move laterally and longitudinally in a horizontal plane, and can drive the sample 20 to move up and down in a vertical plane, thereby realizing driving the light beam modulation module 11 and the sample 20 to move relative to each other in the three directions perpendicular to one another. It can be appreciated that the driving unit 121 of the present embodiment is not limited to drive the sample 20 to move in three directions perpendicular to one another, and may also drive the light beam modulation module 11 to move in three directions perpendicular to one another.

When specifically arranged, the three-dimensional motorized translation stage may be located directly below the objective lens 117, and an upper surface of the three-dimensional motorized translation stage is in a horizontal state, and the central axis of the objective lens 117 is perpendicular to the upper surface of the three-dimensional motorized translation stage.

The imaging unit 122 is constituted by an imaging optical path, and is composed of an emission filter 122a, a tube lens 122b and an imaging camera 122c which are located directly above the objective lens 117. The fluorescence from the sample 20 excited under the action of the modulated light beam 11b passes through the objective lens 117, the dichroic mirror 116, the emission filter 122a and the tube lens 122b sequentially, and then is detected and imaged by the imaging camera 122c. Here, the imaging camera 122c of the present embodiment may be a planar array CCD (Charge-coupled device) or planar array CMOS (Complementary Metal Oxide Semiconductor) camera having a function of Sub-array or ROI (Region of interest), or may be a linear array CCD or linear array CMOS camera having an array mode. In order to facilitate subsequent reconstruction of an optical sectioning image, an imaging area of the imaging camera 122c in this embodiment has N rows of pixels, where N and the imaging direction and width of the imaging area of the imaging camera 122c are the same as the direction and width of the modulated light beam 11b for linear light illumination, respectively.

For the convenience of imaging, the sample 20 of the present embodiment may be in a rectangular block shape. Therefore, when three-dimensional imaging is performed, the sample 20 may be provided to be composed of a sample body and a solid medium wrapped around the sample body, and the solid medium is generally agar, paraffin or resin. Here, the sample 20 may be divided into a plurality of surface layers uniformly arranged from top to bottom, which are respectively a first surface layer, a second surface layer, a third surface layer, etc. Each surface layer is divided into a plurality of sample strips arranged uniformly in the longitudinal direction, which are respectively a first sample strip, a second sample strip, a third sample strip, etc. The width of the sample strip may be set to be the same as the width of the N rows of pixels of the imaging camera 122c.

As shown in FIG. 3, when imaged, the sample is set to have eight surface layers. Each surface layer is divided into four sample strips. The driving unit 121 drives the sample 20 to move continuously at a constant speed in a lateral direction, therefore the imaging camera 122c images the first sample strip 211 of the first surface layer 21. After the imaging of the first sample strip 211 is completed, the sample 20 is returned in the lateral direction, and then the first sample strip 221 of the second surface layer 22 can be imaged. In this way, the first sample strip 231 of the third surface layer 23, the first sample strip 241 of the fourth surface layer 24 and so on may be imaged sequentially. Because the number of layers which can be imaged by the imaging camera 122c in the vertical direction is limited, after the set number of layers which can be imaged is reached, for example, after the imaging of the first sample strip 241 of the fourth surface layer 24 is completed, the sample 20 can be driven to move along the longitudinal direction by the width of one sample strip, and then the second sample strip 212 of the first surface layer 21, the second sample strip 222 of the second surface layer 22, the second sample strip 232 of the third surface layer 23, and the second sample strip 242 of the fourth surface layer 24 are imaged sequentially. Then, all other sample strips of the first surface layer 21 to the fourth surface layer 24 are imaged in the foregoing manner. After the imaging is completed, the first surface layer 21 to the fourth surface layer 24 which have been imaged may be cut off by the cutting module 13. After the cutting off operation, the sample 20 is driven to move upward by a distance equal to a total thickness of four surface layers, and then imaging of the fifth surface layer to the eighth surface layer is performed.

In the imaging process of each sample strip, sample images formed in different rows of pixels are expressed by formula $$I(i)=I^{in}f(i)+I^{out},$$

where $I(i)$ is a sample image formed in an row of pixels, $f(i)$ is a modulation intensity corresponding to the sample image $I(i)$, $I^{in}$ is a focal plane image of the sample image, and $I^{out}$ is a defocusing plane image of the sample image.

Figure 4A:
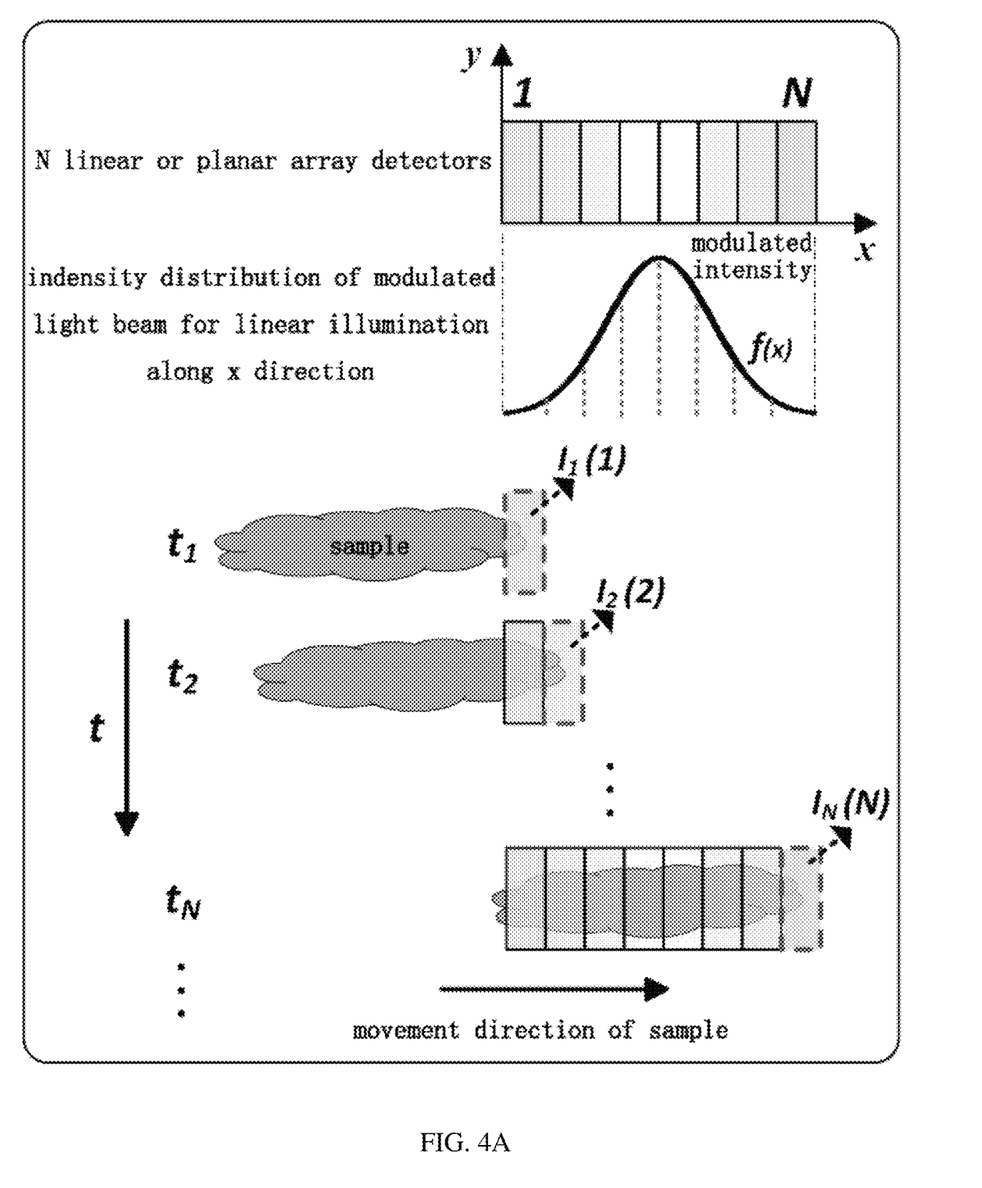
FIGS. 4A-4C are principle diagrams of reconstruction of an optical sectioning image of Embodiment 1 of the present disclosure.

The N rows of pixels of the imaging camera 122c are arranged in a lateral direction which is the same as the movement direction of the sample strip, so as to facilitate imaging of the sample strip of the sample 20 in different rows of pixels respectively. When imaging one sample strip, a single frame exposure duration of the imaging camera 122c is equal to a duration spent by the sample 20 moving by one row of pixels. If an image corresponding to any row of pixels in one image frame is defined as one strip image block, a plurality of strip image blocks corresponding to any row of pixels in multiple image frames are formed by continuous and sequential imaging of each part of the sample 20 and may be stitched into one strip image, and the N rows of pixels may form N strip images. As shown in FIG. 4A, two directions X and Y perpendicular to each other are formed on a plane parallel to an imaging plane of the sample 20. The modulated light beam 11b has following characteristics in the X and Y directions respectively: the modulated light beam 11b has incompletely identical modulated intensities along the X direction on the N rows of pixels, and the modulated light beam 11b has the same modulated intensity along the Y direction on each row of the N rows of pixels. Specifically, the X direction is the lateral direction and the Y direction is the longitudinal direction. Furthermore, a distribution direction and width of the N rows of pixels are the same as and in an object-image conjugate relationship with a distribution direction and width of the modulated light beam 11b for linear light illumination respectively, facilitating the correspondence of the imaging area to the modulated light beam 11b for linear light illumination. The pixel in the present embodiment is a row pixel, and the sample image is a strip image.

As shown in FIG. 4A, when imaged, the sample 20 moves in the direction along which the imaging pixels are arrayed. Since the single frame exposure duration for imaging is equal to a duration spent by the sample 20 moving by one row of pixels, each row of pixels sequentially form a plurality of strip image blocks along the lengthwise direction of the sample strip which are formed by continuous imaging of the sample 20.

The image block acquisition unit 123 in this embodiment is configured to acquire a strip image block of an $i^{th}$ row of pixels in each image frame of a sample strip obtained in an chronological order, and the strip image block is expressed by the formula:

$$I_t(i)=I_m^{in}f(i)+I_m^{out}$$

where $I_t(i)$ is a strip image block corresponding to the $i^{th}$ row of pixels in the $i^{th}$ image frame, $I_m^{in}$ is a focal plane image of the strip image block corresponding to $I_t(i)$, that is, $I_m^{in}$ is a focal plane image of the $m^{th}$ strip image block in a complete strip image, $I_m^{out}$ is a defocusing image of the strip image block corresponding to $I_t(i)$, and $f(i)$ is a modulation intensity corresponding to the $i^{th}$ row of pixels.

The stitching unit 124 is configured to successively stitch strip image blocks of the $i^{th}$ row of pixels in each image frame of the sample strip to obtain a strip image of the row of pixels according to the formula of:

$$I(i)=\Sigma_i^{M+i-1}I_t(i),$$

where M is a number of strip image blocks corresponding to the complete strip image, and specifically, the strip image is formed by stitching M strip image blocks, where $I_m^{in}$ is a focal plane image corresponding to the $m^{th}$ strip image block in the strip image, and m≤M.

It should be noted that, a strip image is formed by shifting and stitching a plurality of strip image blocks corresponding to a row of pixels, and is the above-described strip image, that is, N rows of pixels may be respectively stitched to form N strip images.

The demodulation module 14 is configured to demodulate the strip image of one sample strip of one surface layer into an optical sectioning image, and reconstruct the optical sectioning image of each sample strip of each surface layer into a three-dimensional image.

The demodulation module 14 may include an image accumulation unit 141, a demodulation unit 142, and a reconstruction unit 143. The image accumulation unit 141 is configured to accumulate strip images of at least one row of pixels of one sample strip to form a first strip image, and accumulate strip images of at least one row of pixels of the one sample strip to form a second strip image. The demodulation unit 142 is configured to demodulate the first strip image and the second strip image into an optical sectioning image. The reconstruction unit 143 is configured to reconstruct optical sectioning images of a plurality of sample strips into a three-dimensional image.

When the N strip images are acquired, one or two or more of the strip images may be arbitrarily selected to accumulate and form the first strip image. Then, the second strip image is obtained by accumulation in the same manner. In order to avoid that the optical sectioning image acquired by the above demodulation algorithm is zero, in this embodiment, an accumulated value of the modulation intensities corresponding to the strip images in a pixels and an accumulated value of the modulation intensities corresponding to the strip images in β pixels may be different.

After the accumulation, the demodulation unit 142 may obtain a focal plane image (that is, an optical sectioning image) of the corresponding sample strip according to the following demodulation algorithm, and the demodulation formula of the demodulation algorithm adopted by the demodulation unit 142 is $$I^{in}=c\times|\beta I_1-\alpha I_2|,$$

where α and β are positive integers, c is a constant greater than 0, $I_1$ is an accumulated sum of strip images acquired in α pixels, and $I_2$ is an accumulated sum of sample images acquired in β pixels; an accumulated value of modulation intensities corresponding to the sample images in the α pixels is different from an accumulated value of modulation intensities corresponding to the sample images in the β pixels.

Since each strip is formed by stitching a plurality of strip image blocks, $I^{in}=\Sigma I_m^{in}$.

For the convenience of explanation of the acquisition process of the strip image of the present embodiment, the following embodiments will be described.

Embodiment 1

As shown in FIG. 4A, when the sample moves in the direction along which N rows of pixels are arrayed, N+M−1 image frames can be obtained within a time interval from time $t_1$ to $t_{N+M-1}$ (M is the number of strip image blocks corresponding to a complete strip image, N is 8 and M is 9 in this embodiment). In addition, each row of pixels in the N+M−1 image frames corresponds to a strip image block. For example, a strip image block $I_1(1)$ of a first row of pixels in a first image frame, a strip image block $I_2(1)$ of the first row of pixels of a second image frame, a strip image block $I_N(1)$ of the first row of pixels of the Nth image frame, and a strip image block $I_{N+M-1}(1)$ of the first row of pixels of the (N+M−1)th of image frame can be obtained. The strip image block $I_1(1)$, the strip image block $I_2(1)$ to the strip image block $I_{N+M-1}(1)$ may be successively stitched to form a strip image, and each of corresponding second to Nth rows of pixels may be stitched to form a corresponding strip image.

Figure 4B:
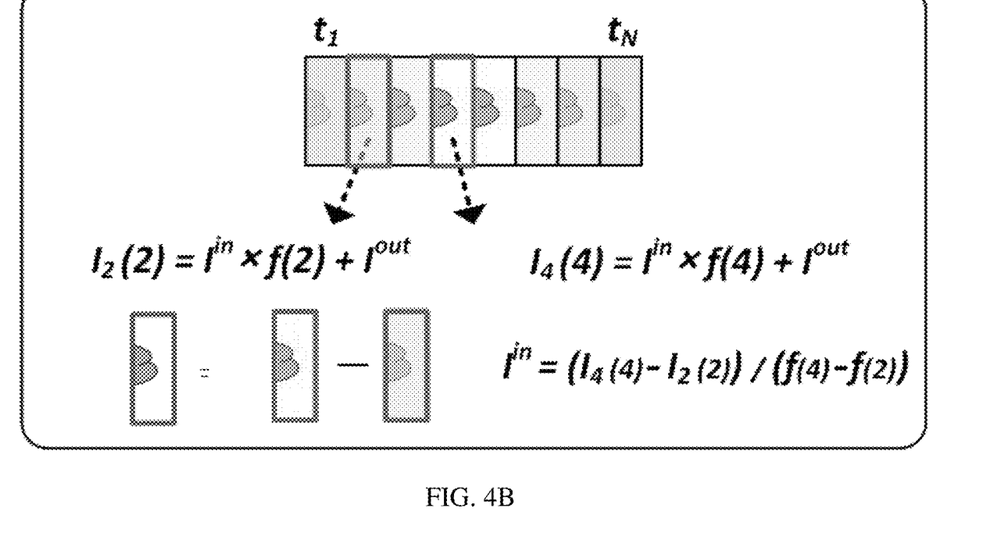
Figure 4C:
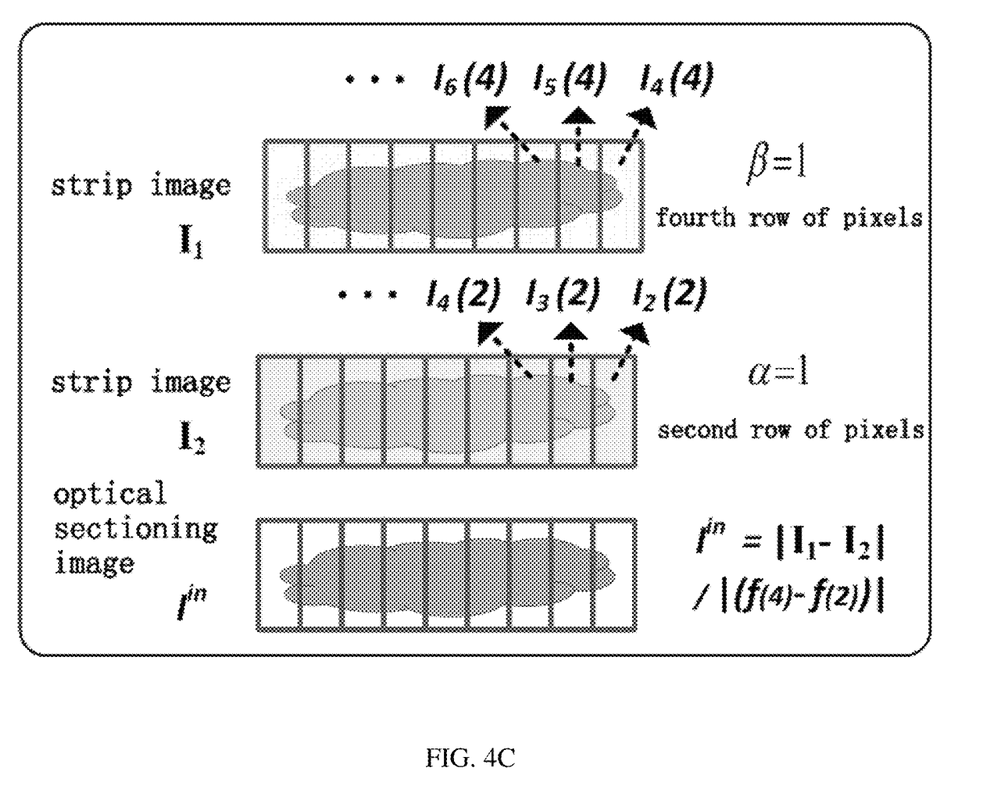

As shown in FIGS. 4B and 4C, in order to explain how to acquire a clearer strip image block and a clearer strip image, firstly, the second row of pixels and the fourth row of pixels are taken as examples for description. Because $I(4)=\Sigma_4^{m+3}I_t(4)$ and $I_t(4)=I_m^{in}f(4)+I_m^{out}$ can be obtained from the formulas of the strip image block and the sample image respectively, the strip image block in the fourth row of pixels of the fourth image frame is $I_4(4)=I_1^{in}f(4)+I_1^{out}$ (where m=1, because a strip image is formed by stitching nine strip image blocks, and the strip image block in the fourth row of pixels in the fourth image frame is the first strip image block of the strip image, that is, $I_1^{in}$ is a focal plane image corresponding to a first strip image block in the strip image). Correspondingly, $I(2)=\Sigma_2^{M+1}I_t(2)$, where $I_t(2)=I_m^{in}f(2)+I_m^{out}$, the strip image block of the second row of pixels of the second image frame is $I_2(2)=I_1^{in}f(2)+I_1^{out}$; $I_1$ is an accumulated sum of the sample images acquired in the fourth row of pixels, that is $I_1=\Sigma_4^{M+3}I_t(4)$, $I_2$ is an accumulated sum of the sample images acquired in the second row of pixels, that is $I_2=\Sigma_2^{M+1}I_t(2)$, the values of α and β are both selected as 1. $|I(4)-I(2)|=|\Sigma_4^{M+3}I_t(4)-\Sigma_2^{M+1}I_t(2)|=|f(4)-f(2)|\Sigma I_m^{in}$, therefore $I^{in}=\Sigma I_m^{in}=|\Sigma_4^{M+3}I_t(4)-\Sigma_2^{M+1}I_t(2)|/|f(4)-f(2)|=|I_1-I_2|/|f(4)-f(2)|$.

Embodiment 2

Figure 5:
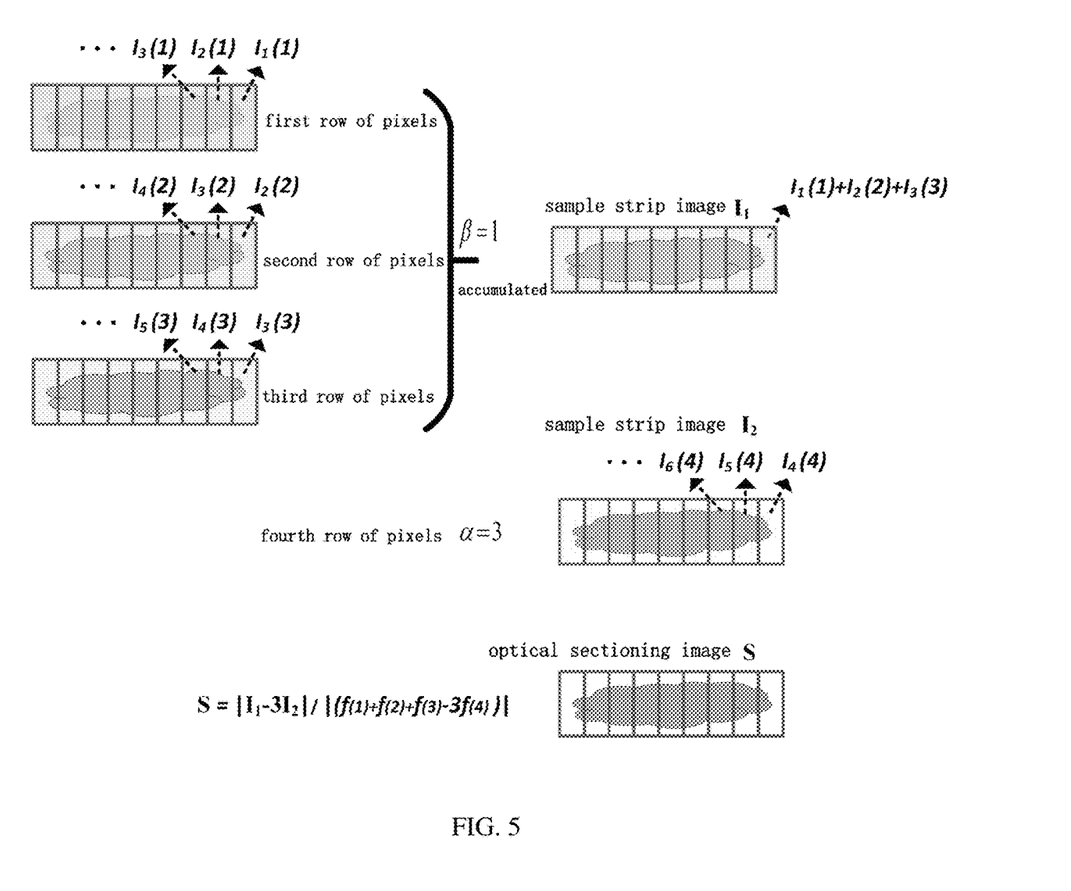
FIG. 5 is a principle diagram of reconstruction of an optical sectioning image of Embodiment 2 of the present disclosure.

As shown in FIG. 5, the strip image formed by stitching in the fourth row of pixels is $I(4)=\Sigma_4^{m+3}I_t(4)$, where $I_t(4)=I_m^{in}f(4)+I_m^{out}$; the strip image formed by stitching in the first row of pixels is $I(1)=\Sigma_1^{M}I_t(1)$, where $I_t(1)=I_m^{in}f(1)+I_m^{out}$; the strip image formed by stitching in the second row of pixels is $I(2)=\Sigma_2^{M+1}I_t(2)$, where $I_t(2)=I_m^{in}f(2)+I_m^{out}$; and the strip image formed by stitching in the third row of pixels is $I(3)=\Sigma_3^{M+2}I_t(3)$, where $I_t(3)=I_m^{in}f(3)+I_m^{out}$.

If $I_1$ is an accumulated sum of the sample images acquired in the first, second and third rows of pixels, that is $I_1=\Sigma_1^{M}I_t(1)+\Sigma_2^{M+1}I_t(2)+\Sigma_3^{M+2}I_t(3)$, and $I_2$ is an accumulated sum of the sample images acquired in the fourth row of pixels, that is $I_2=\Sigma_4^{M+3}I_t(4)$, correspondingly, the value of a should be selected as 3, and the value of β should be selected as 1. $|(I(1)+I(2)+I(3))-3I(4)|=|(\Sigma_1^{M}I_t(1)+\Sigma_2^{M+1}I_t(2)+\Sigma_3^{M+2}I_t(3))-3\Sigma_4^{M+3}I_t(4)|=|(f(1)+f(2)+f(3))-3f(4)|\Sigma I_m^{in}$ can be obtained from the demodulation formula, therefore $I^{in}=\Sigma_m^{in}=|(\Sigma_1^{M}I_t(1)+\Sigma_2^{M+1}I_t(2)+\Sigma_3^{M+2}I_t(3))-3\Sigma_4^{M+3}I_t(4)|/|(f(1)+f(2)+f(3))-3f(4)|=|I_1-3I_2|/|(f(1)+f(2)+f(3))-3f(4)|$.

The optical sectioning images of individual sample strips may be sequentially obtained by the demodulation algorithm, and the reconstruction unit 143 may stitch all the optical sectioning images to form a stereoscopic three-dimensional image.

It should be noted that when the longitudinal width of the sample 20 is smaller than the width of the imaging region of the N rows of pixels of the imaging camera 122c, each surface layer has only one sample strip, and the sample 20 does not need to move longitudinally during the imaging process. When the longitudinal width of the sample 20 is smaller than the width of the imaging area of the N rows of pixels of the imaging camera 122c and the thickness of the sample 20 is smaller than the depth to which the imaging camera 122c can perform imaging, for example, the sample only have two surface layers, then the sample 20 only needs to move back and forth once in the lateral direction, and it is not necessary for the cutting module 13 to cut off any surface layer. When the width of the sample 20 is smaller than the width of the imaging area of the N rows of pixels of the imaging camera 122c and the thickness of the sample 20 is smaller than the set thickness of one surface layer, the sample 20 only needs to be subject to scanning imaging only once, which may be considered as two-dimensional imaging. It can be seen from the above that, in this embodiment, a three-dimensional image is formed by superimposing a plurality of two-dimensional images.

The specific embodiments of the present disclosure described above do not constitute a limitation to the scope of protection of the present disclosure. Various other corresponding changes and modifications made in accordance with the technical idea of the present disclosure should be included within the scope of protection of the claims of the present disclosure.

Specific embodiments disclosed above in the disclosure can not construed as limiting the scope of protection of the disclosure. Various other corresponding changes and modifications made in accordance with the technical conception of the present disclosure should be included within the scope of protection of the claims of the present disclosure.

What is claimed is:

1. A high-throughput optical sectioning three-dimensional imaging system, comprising:
    a light beam modulation module configured to modulate a light beam into a modulated light beam capable of being focused on a focal plane of an objective lens and being defocused on a defocusing plane of the objective lens, wherein the light beam modulation module comprises a shaping optical path for shaping the light beam into a linear light beam and a modulation optical path for modulating the linear light beam into the modulated light beam;
    an imaging camera configured to image, in different rows of pixels, at least one sample strip of at least one surface layer of a same sample under illumination of the modulated light beam to form multiple sample images, wherein the modulated light beam has incompletely identical modulated intensities on the different rows of pixels in a direction along which the different rows of pixels are arrayed, the sample strip moves in the direction along which the different rows of pixels are arrayed when imaged, and each of the different rows of pixels sequentially forms a plurality of strip image blocks in the direction along which the different rows of pixels are arrayed, the plurality of strip image blocks formed by each of the different rows of pixels are used to be stitched into a corresponding one of the sample images of the same sample strip;
    a cutter configured to cut off an imaged surface layer of the sample;
    a processor configured to demodulate a sample image of one sample strip of one surface layer into an optical sectioning image, and reconstruct the optical sectioning image of each sample strip of each surface layer into a three-dimensional image.

2. The high-throughput optical sectioning three-dimensional imaging system according to claim 1, wherein a formula expression of the sample image of the sample strip in the imaging camera is:

$$I(i)=I^{in}f(i)+I^{out}$$

where I(i) is a sample image formed in an $i^{th}$ row of pixels, f(i) is a modulation intensity corresponding to the sample image I(i), $I^{in}$ is a focal plane image of the sample image, and $I^{out}$ is a defocusing plane image of the sample image; and a demodulation formula in the processor is:

$$I^{in}=c\times|\beta I_1-\alpha I_2|$$

where $\alpha$ and $\beta$ are positive integers, c is a constant greater than 0, $I_1$ is an accumulated sum of sample images acquired in $\alpha$ rows of pixels, and $I_2$ is an accumulated sum of sample images acquired in $\beta$ rows of pixels, and $\beta\times$(an accumulated value of modulation intensities corresponding to the sample images in the $\alpha$ rows of pixels) is different from $\alpha\times$(an accumulated value of modulation intensities corresponding to the sample images in the $\beta$ rows of pixels).

3. The high-throughput optical sectioning three-dimensional imaging system according to claim 2, further comprising:
    a three-dimensional motorized translation stage configured to drive the light beam modulation module and the sample to move relative to each other in three directions perpendicular to one another; and
    an imaging optical path configured to perform continuous imaging along a lengthwise direction of the sample strip, the lengthwise direction of the sample strip being the same as one of the directions along which the light beam modulation module and the sample move relative to each other.

4. The high-throughput optical sectioning three-dimensional imaging system according to claim 3, wherein an imaging area of the camera in the imaging camera has N rows of pixels, where N≥2; two directions X and Y perpendicular to each other are formed on a plane parallel to an imaging plane of the sample, and the modulated light beam has following characteristics in the X and Y directions respectively: the modulated light beam having incompletely identical modulated intensities along the X direction on the N rows of pixels, and the modulated light beam having a same modulated intensity along the Y direction on each row of the N rows of pixels; the pixel being a row pixel, and the sample image being a strip image.

5. The high-throughput optical sectioning three-dimensional imaging system according to claim 4, the processor is further configured to acquire a strip image block of an $i^{th}$ row of pixels in each image frame of a sample strip obtained in an chronological order, and a formula expression of the strip image block is $I_t(i)=I_m^{in}f(i)+I_m^{out}$, where $I_t(i)$ is a strip image block corresponding to the $i^{th}$ row of pixels in a $t^{th}$ image frame, $I_m^{in}$ is a focal plane image of the strip image block corresponding to $I_t(i)$, that is, $I_m^{in}$ is a focal plane image of a $m^{th}$ strip image block in a complete strip image, $I_m^{in}$ a defocusing plane image of the strip image block corresponding to $I_t(i)$, and f(i) is a modulation intensity corresponding to the $i^{th}$ row of pixels; and the processor is further configured to successively stitch strip image blocks of the $i^{th}$ row of pixels in each image frame of the sample strip to obtain a strip image of the $i^{th}$ row of pixels according to the formula of $I(i)=\Sigma_i^{M+i-1}I_t(i)$, where M is a number of strip image blocks corresponding to the complete strip image, and m≤M.

6. The high-throughput optical sectioning three-dimensional imaging system according to claim 5, wherein the processor is further configured to accumulate strip images of at least one row of pixels of one sample strip to form a first strip image, accumulate strip images of at least one row of pixels of the one sample strip to form a second strip image, demodulate the first strip image and the second strip image into the optical sectioning image of the strip image according to the demodulation formula, then $I^{in}=\Sigma I_m^{in}$, and reconstruct optical sectioning images of a plurality of sample strips into the three-dimensional image.

7. The high-throughput optical sectioning three-dimensional imaging system according to claim 6, wherein a single frame exposure duration of imaging by the imaging optical path is equal to a duration spent by the light beam modulation module and the sample moving by one row of pixels relative to each other along the lengthwise direction of the sample strip, and a distribution direction and width of the N rows of pixels are the same as and in an object-image conjugate relationship with a distribution direction and width of the modulated light beam respectively.

8. The high-throughput optical sectioning three-dimensional imaging system according to claim 1, wherein the shaping optical path comprises a laser light source, a first lens, a second lens, and a cylindrical lens which are sequentially arranged along a travel direction of the illumination light; and the modulation optical path comprises a third lens configured to modulate divergent light of the linear light beam into parallel light, a dichroic mirror configured to modulate an incident direction of the linear light beam, and an objective lens arranged coaxially with the linear light beam the incident direction of which has been modulated.

9. The high-throughput optical sectioning three-dimensional imaging system according to claim 8, wherein the three-dimensional motorized translation stage is a translation stage configured to drive the sample to move in three directions perpendicular to one another, the translation stage is located at a side of the objective lens away from the dichroic mirror, and the translation stage is perpendicular to an optical axis of the modulated light beam; and the cutter comprises one or more of a vibrating blade cutter, a diamond cutter, and a hard alloy cutter.

* * * * *